O. REDMOND.
Assignor by mesne assignments to H. H. DOUBLEDAY.
PACKING FOR OIL-WELLS.
No. 7,495. Fig. 2. Reissued Feb. 6, 1877. Fig. 1.
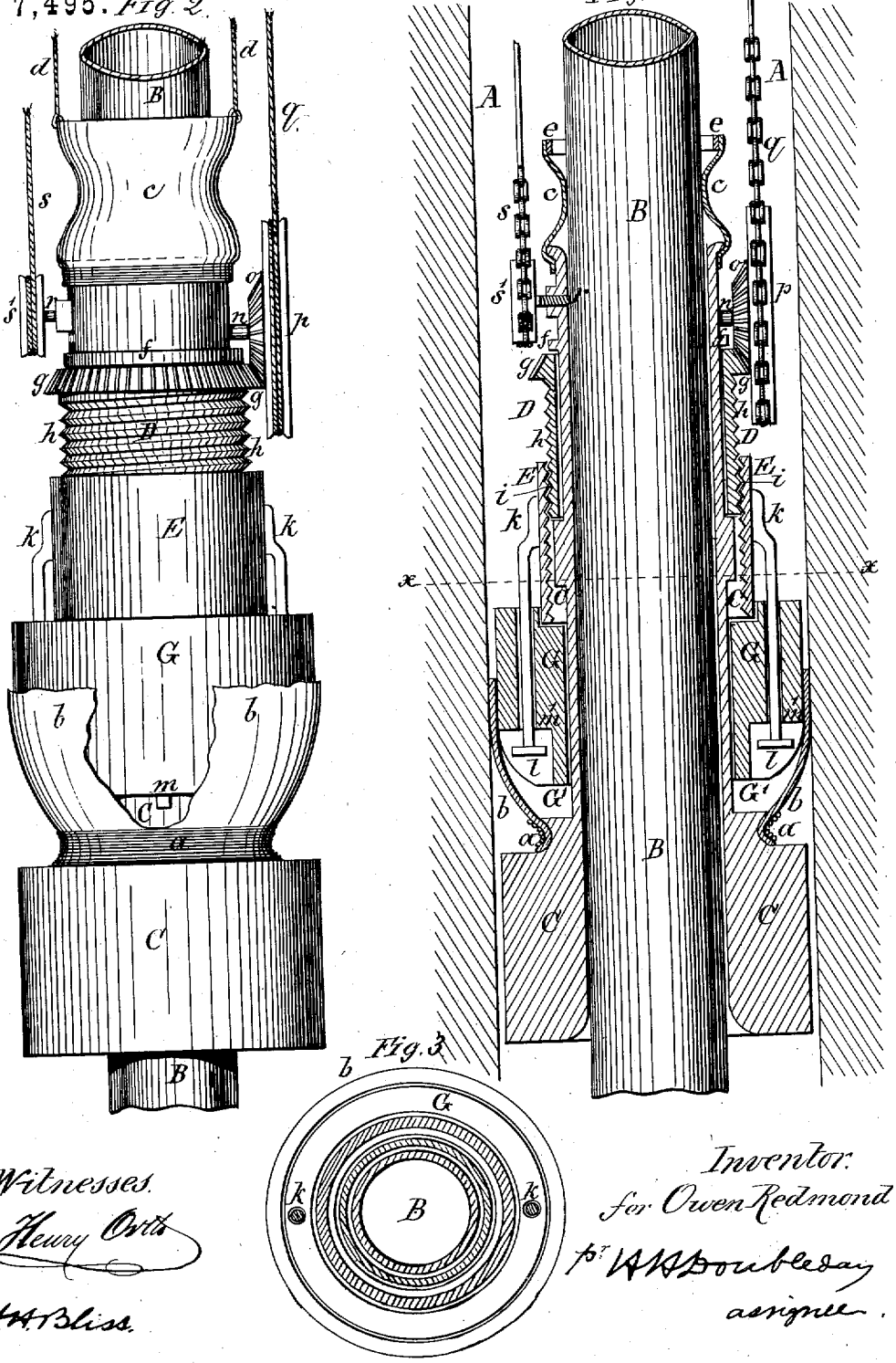
Witnesses.
Henry Orth
H. H. Bliss.
Inventor.
for Owen Redmond
by H. H. Doubleday
assignee.

UNITED STATES PATENT OFFICE.

OWEN REDMOND, OF ROCHESTER, N. Y., ASSIGNOR, BY MESNE ASSIGNMENTS, TO HENRY H. DOUBLEDAY, OF WASHINGTON, D. C.

IMPROVEMENT IN PACKING FOR OIL-WELLS.

Specification forming part of Letters Patent No. 59,319, dated October 30, 1866; reissue No. 7,495, dated February 6, 1877; application filed January 25, 1877.

DIVISION B.

*To all whom it may concern:*

Be it known that OWEN REDMOND, of Rochester, in the county of Monroe and State of New York, has invented certain new and useful Improvements in Packing for Oil-Wells; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1 is a vertical section taken on line *x x* of Fig. 3. Fig. 2 is an elevation, and Fig. 3 is a transverse or horizontal section, taken on the line *y y*, Fig. 1.

Like letters of reference indicate corresponding parts in all the figures.

When the ordinary seed-bag is employed for packing the discharging-tube of an oil-well the pressure of the swelled seed upon the tube and the bore of the well is so great that it is practically impossible to withdraw the tube without destroying the packer, and sometimes the bag is stripped from the tubing, and delay occasioned in removing the bag after the tubing is taken out.

The object of this part of the invention is to construct a packer which can be located at the desired point in the well, and can be removed without serious injury to itself; and to this end it consists in the employment, in combination with the discharging-tube in an oil-well, of two flexible packings, of rubber or other suitable material, one packing being adapted to be pressed against said discharging-tube, and the other against the wall of the well, by the superincumbent column of water.

As represented in the drawings, A is the shaft or bore of the well, and B the elevating or discharging tube. The packing may be of any construction that will secure the following effects, to wit: First, it must be capable of being compressed or packed against the wall of the well, and of being released therefrom at the will of the operator; and, secondly, it must slide up and down on the central elevating-tube, so as to be fixed in any desired place without removing the tubing, and pack both the shaft and the tube.

I prefer that shown in the drawings, which is of the following construction: Around the elevating-tube B fits a cylinder or tube, C, of suitable length, sliding up and down over the oil-tube, and preferably made of considerable weight. To the lower portion is attached at *a*, in any suitable manner, a cup-shaped disk or ring, *b*, of buckskin, leather, or other suitable material, which is placed with its mouth or open end or side upward for the purpose of packing the annular space between the tube or cylinder C and the wall of the well, the shape of the cap adapting it to be forced against the wall of the well by the superincumbent column of water. To the top of cylinder C is applied a flexible collar or sleeve, *c*, which packs against the oil-tube B, as clearly represented. The weight of the packing device is made sufficient to carry it (the sleeve *c*) downward over the oil-tube easily, and, in raising, it will usually come up without difficulty, or, if desired, small cords or wires *d d*, Fig. 2, may be employed for the purpose. I prefer to insert a small ring, *e*, in the upper end to keep it open.

It will be seen that if the disk or rim *b* and the collar *c* are packed tightly no water can pass through the packer to the oil below.

Around the cylinder C, and near its upper end, and between shoulders *f f*, is situated a collar or sleeve, D, turning loosely, and having at its top a beveled cog-ring, *g*, and provided upon its sides with a screw-thread, *h*. Outside the lower part of this collar is another sleeve or collar, E, which serves as a nut, its inner surface being also cut into a screw-thread, *i*, that engages with the thread *h*. This latter collar E can move up and down on cylinder C, but is not allowed to rotate thereon by reason of arms *k k*, the upper ends of which are rigidly attached to it, (cylinder C,) the lower ends of the arms passing down through sockets in a circular wedge, G, and have heads *l l* on their lower ends. The annular wedge G is simply a hollow head, whose lower edge is beveled, as shown at G′, Fig. 1, and which also slides freely up and down on cylinder C, but is prevented from rotation thereon by means of a feather or spline, *m*, on the cylinder C, fitting in a groove or seat in the wedge G. Thus it will be perceived that if the collar D be turned in the proper direction the collar E will be forced down as a nut, and, consequently, also the annular wedge G, which expands the packing-rim *b* out against the sides of the well. By turning the collar E in an opposite direction the wedge G will be raised and the packing released from the wall of the well, the heads *l l* of the arms *k k* engaging with the shoulders *m′ m′* of the wedge for that purpose.

On a bearing, *n*, near the top of the cylinder C, is situated a bevel-pinion, *o*, which gears with the cog-ring *g*. This pinion is rigidly attached to a grooved wheel or sheave, *p*, which receives motion by either a wire or cord, *q*, wound once or twice around its periphery, (see Fig. 2,) or by means of a chain engaging with spurs upon its rim, (see Fig. 1,) or in some similar manner. In either case the wire is double and extends to the top of the well. By this means it will be seen the wedge G may be tightened or loosened at any time by simply operating the wire or chain, provided the cylinder C be fastened securely to the oil-tube. I secure this cylinder to the oil-tube in any desired position by means of a set-screw, *r*, whose point, passing through the cylinder, strikes against the oil-tube, and when screwed up by means of the wire *s* passing around sheave *s′* on the set-screw, draws the cylinder so tightly against the tube that it cannot slip. The wire *s* also extends to the top of the well.

In addition to operating the parts *p* and *r* the wires or chains may serve to raise or lower the packing device in the well.

From the above description it will be seen that both the cup-shaped ring *b* and the collar or sleeve *c* are adapted to be pressed firmly against the discharging-tube and the wall of the well, respectively, by the weight of the column of water in such manner as to prevent the water from flowing past the packer into the lower part of the well, while at the same time the operator can withdraw the devices from the well without material injury to the parts.

What is claimed as the invention of OWEN REDMOND is—

The combination, with the discharging-tube B, of the cylinder C, cup-shaped ring *b*, and the flexible collar or sleeve *c*, substantially as set forth.

In testimony that I claim the foregoing I have hereunto set my hand this 22d day of January, 1877.

HENRY H. DOUBLEDAY.

Witnesses:
G. H. EVANS,
A. M. TANNER.